US006915487B2

(12) United States Patent
Costigan, Jr. et al.

(10) Patent No.: US 6,915,487 B2
(45) Date of Patent: Jul. 5, 2005

(54) METHOD, SYSTEM, COMPUTER PROGRAM PRODUCT, AND ARTICLE OF MANUFACTURE FOR CONSTRUCTION OF A COMPUTER APPLICATION INTERFACE FOR CONSUMPTION BY A CONNECTOR BUILDER

(75) Inventors: Peter D. Costigan, Jr., Los Gatos, CA (US); Laurence E. England, Morgan Hill, CA (US); James R. Rhyne, II, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 09/734,833

(22) Filed: Dec. 11, 2000

(65) Prior Publication Data

US 2002/0073118 A1 Jun. 13, 2002

(51) Int. Cl.[7] .................................................. G09G 5/00
(52) U.S. Cl. ........................ 715/771; 715/854; 715/803; 715/810; 715/967
(58) Field of Search ................................. 715/771, 854, 715/803, 810, 967; 345/854, 803, 810, 967

(56) References Cited

U.S. PATENT DOCUMENTS

| | | | | |
|---|---|---|---|---|
| 5,163,156 | A | | 11/1992 | Leung et al. ................ 395/800 |
| 5,522,073 | A | | 5/1996 | Courant et al. ............. 395/700 |
| 5,640,553 | A | * | 6/1997 | Schultz ........................... 707/5 |
| 5,815,711 | A | | 9/1998 | Sakamoto et al. .......... 395/701 |
| 6,117,184 | A | | 9/2000 | Sakamoto et al. ............. 717/1 |
| 6,253,366 | B1 | * | 6/2001 | Mutschler, III ............. 717/104 |

FOREIGN PATENT DOCUMENTS

| | | | | |
|---|---|---|---|---|
| JP | 5204620 A2 | 8/1993 | ............. G06F/9/06 |
| JP | 10269068 A2 | 10/1998 | ............. G06F/9/06 |

OTHER PUBLICATIONS

Battle, Steven A. and Johnson, Ransford B. "Flexible Information Presentation with XML". 1998, The Institution of Electrical Engineers. 6 pgs.*

Cathcart, Mark, *Web Gateway Proramming for OS/390*, Enterprise Systems Journal, Apr. 1998 v13 n4 p48 (5).

*More on IBM's OS/390 Mainframe OS, Version 2*, Newsbytes Jun. 10, 1997 pNEW06100043.

Nash, Kim S., *Old Iron, New Links*, Computerworld, Sep 30, 1996 v30 n40 pS1 (1).

*Extending the Net to the Mainframe*, SCORT Software Releases SCORT Intranet Connector, Business Wire,Mar. 20, 2000, Marlborough,Mass.

* cited by examiner

Primary Examiner—John Cabeca
Assistant Examiner—Michael Roswell
(74) Attorney, Agent, or Firm—Rabindranath Dutta; Prentiss W. Johnson; Konrad Raynes & Victor LLP

(57) ABSTRACT

An interface of an application program is identified by parsing the source code of the application program to identify meta information, and the meta information and a link pointing to an original location of the meta information within the application program are stored in a repository. A user may then be allowed to query the repository to determine which source files and which interfaces comprise the application program. Responsive to the query, a new source file is constructed which contains the interfaces comprising the application program. The new source file and a link pointing to a location of the new source file are also stored in the repository. A meta language document is constructed which contains a description of the application program interfaces to enable a a connector building tool to build an interface to the application program.

24 Claims, 6 Drawing Sheets

METHOD, SYSTEM, COMPUTER PROGRAM PRODUCT, AND ARTICLE OF MANUFACTURE FOR CONSTRUCTION OF A COMPUTER APPLICATION INTERFACE FOR CONSUMPTION BY A CONNECTOR BUILDER

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to software re-engineering, and more particularly to identifying an interface of an application program.

2. Description of the Related Art

With the advent of the World Wide Web (Web), many enterprises prefer to leverage existing mainframe application programs by connecting a Web front-end to those existing mainframe application programs. These mainframe application programs may include transaction systems such as the IBM® Customer Information Control System (CICS®), the IBM® Information Management System (IMS), or the IBM® DB2® relational database system. (IBM®, CICS®, and DB2® are registered trademarks of International Business Machines Corporation in the United States, other countries, or both.) To bridge between the Web front-end and the existing mainframe application program, a block of code, commonly known as a connector, is generated. Tools that generate a connector are available from various manufacturers, such as the IBM® Enterprise Access Builder, IBM® WebSphere Application Development Studio, IBM® VisualAge® Interspace, IBM® VisualAge® for Java®, or Microsoft® COM Transaction Integrator (COMTI). (VisualAge® is a registered trademark of International Business Machines Corporation in the United States, other countries, or both. WebSphere is a trademark of International Business Machines Corporation in the United States, other countries, or both. Java and all Java-based trademarks are trademarks of Sun Microsystems, Inc. in the United States, other countries, or both. Microsoft is a trademark of Microsoft Corporation in the United States, other countries, or both.) To generate a connector from a specified source code file comprising a mainframe application program, a connector tool parses the source code contained in a specified source code file to obtain the information necessary to generate the connector. This conventional approach may generate the appropriate connector if the specified source code file contains the complete information necessary to generate the connector. However, the specified source code file may not contain any of the necessary information or may only contain a portion of the necessary information. For example, it may be a COBOL source code file containing a COPY statement which points to another source code file, a COBOL COPYBOOK, which actually contains the necessary information. Typically, this complete information is contained in and dispersed among multiple source code files. Thus, there is a need for a connector tool which can generate a connector based upon information dispersed among multiple source code files.

Conventional connector generators are also language dependent, such as a Java-to-COBOL connector generator, a Java-to-CICS connector generator, or a C++-to-COBOL connector generator. The Java-to-COBOL connector generator cannot be used to generate a C++-to-COBOL connector, and the C++-to-COBOL connector generator cannot be used to generate a Java-to-COBOL connector. Thus, generating a second connector for a second language involves a repetition of the identification, parsing, selection, and editing steps which were performed for the generation of the first connector. Even if the same connector is being re-generated, i.e., the second connector is the same language as the first connector, the steps are repeated. The reuse of prior parsing, identification, and editing is difficult as conventional systems fail to store this information in a form which is consummable by a connector building tool. Thus, there is a need for a connector tool which supports multiple target languages, and which reuses information and analysis from one generation to the next or from one language to another language.

Conventional methods have failed to provide solutions to these problems. Thus, there is a clearly felt need for a method, system, article of manufacture, and computer program product for providing improved identification of an interface of an application program dispersed among multiple files for consumption by a connector building tool.

SUMMARY OF THE INVENTION

The present invention comprises a method, system, computer program product, and article of manufacture for identifying an interface of an application program. The source code of the application program is parsed to identify meta information, and the meta information and a link pointing to an original location of the meta information within the application program are stored in a repository. A user may then be allowed to query the repository to determine which source files and which interfaces comprise the application program. Responsive to the query, a new source file is constructed which contains the interfaces comprising the application program. The new source file and a link pointing to a location of the new source file are also stored in the repository. A meta language document is constructed which contains a description of the application program interfaces to enable a connector building tool to build an interface to the application program.

One aspect of a preferred embodiment of the present invention parses source code of an application program to identify meta information.

Another aspect of a preferred embodiment of the present invention stores the meta information and a link pointing to an original location of the meta information within the application program in a repository.

Another aspect of a preferred embodiment of the present invention allows a user to query the repository to determine which source files and which interfaces comprise the application program.

Another aspect of a preferred embodiment of the present invention constructs a new source file which contains the interfaces comprising the application program.

Another aspect of a preferred embodiment of the present invention stores in the repository the new source file and a link pointing to a location of the new source file.

Another aspect of a preferred embodiment of the present invention constructs a meta language document which contains a description of the application program interfaces to enable a a connector building tool to build an interface to the application program.

A preferred embodiment of the present invention has the advantage of providing improved identification of an application program's interface in a language-independent manner.

A preferred embodiment of the present invention has the further advantage of identifying an application program's interface dispersed among multiple files.

A preferred embodiment of the present invention has the further advantage of providing a single source file containing the interfaces comprising the application program.

A preferred embodiment of the present invention has the further advantage of providing an identification of the interfaces comprising the application program which relieves a connector building tool of the burden of parsing multiple different languages.

A preferred embodiment of the present invention has the further advantage of providing improved usability in a tool for identifying application program interfaces.

A preferred embodiment of the present invention has the further advantage of providing improved functionality in a tool for identifying application program interfaces.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
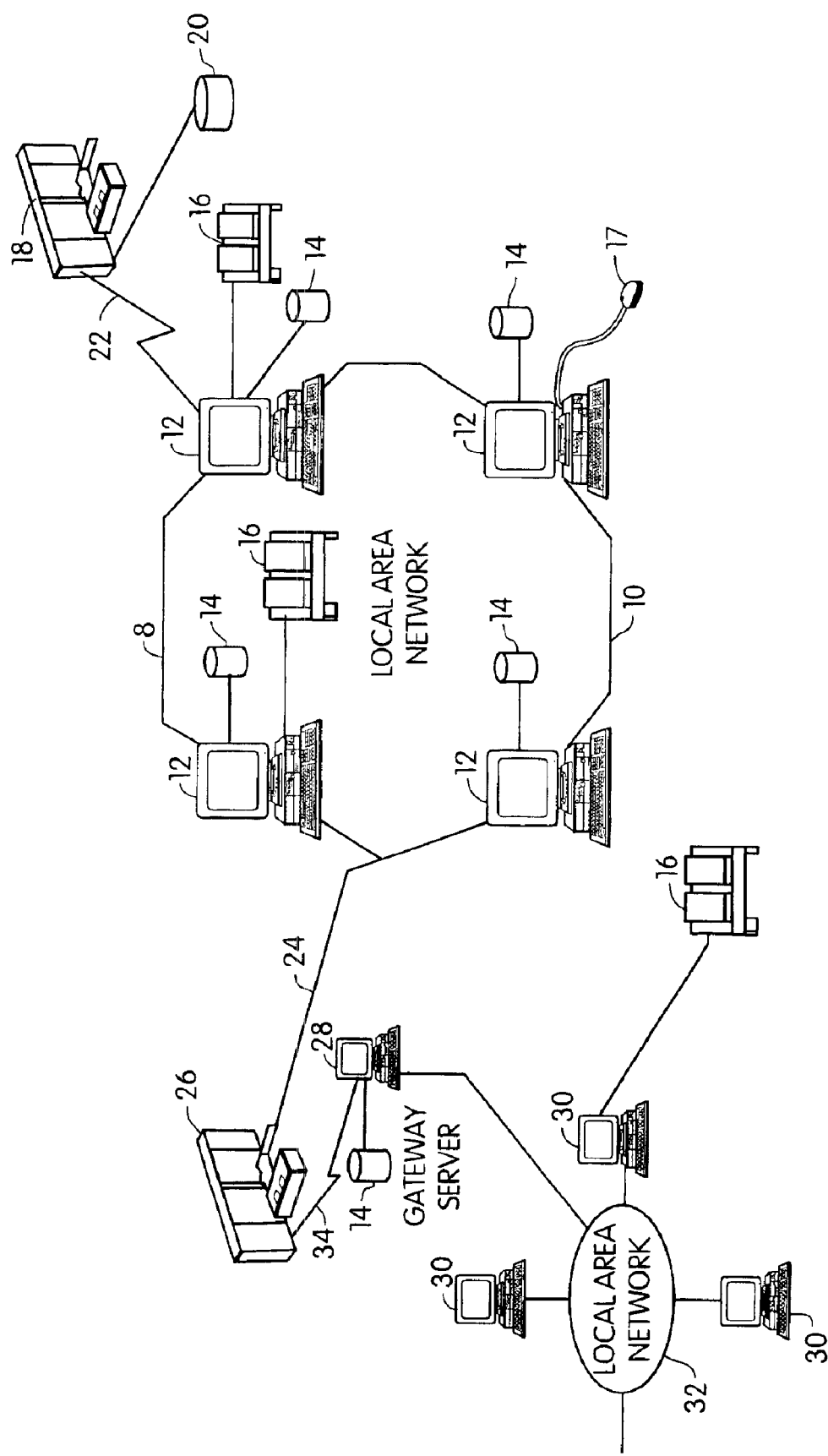
FIG. 1 is a block diagram of a distributed computer system used in performing the method of the present invention, forming part of the apparatus of the present invention, and which may use the article of manufacture comprising a computer-readable storage medium having a computer program embodied in said medium which may cause the computer system to practice the present invention.

Referring first to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Alternatively, networks 10 and 32 may be intranets or portions of the internet. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 may be an IWS which serves to link LAN 32 to LAN 10. Preferably, server 28 is a web application server which passes transactions from a requester 30 on the internet 32 to the mainframe 18 upon which a back-end application serving the transaction is executing.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation, LAN server, or host from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

As will be appreciated upon reference to the foregoing, it is often desirable for a user to link an application program on the mainframe 18 to the internet 32 and/or World Wide Web, where the application program was not originally designed for Web or internet based transactions. A preferred embodiment of the present invention assists the user in performing such a Web-enablement adaptation of the application program by providing improved identification of an interface of an application program dispersed among multiple files for consumption by a connector building tool.

Figure 2:
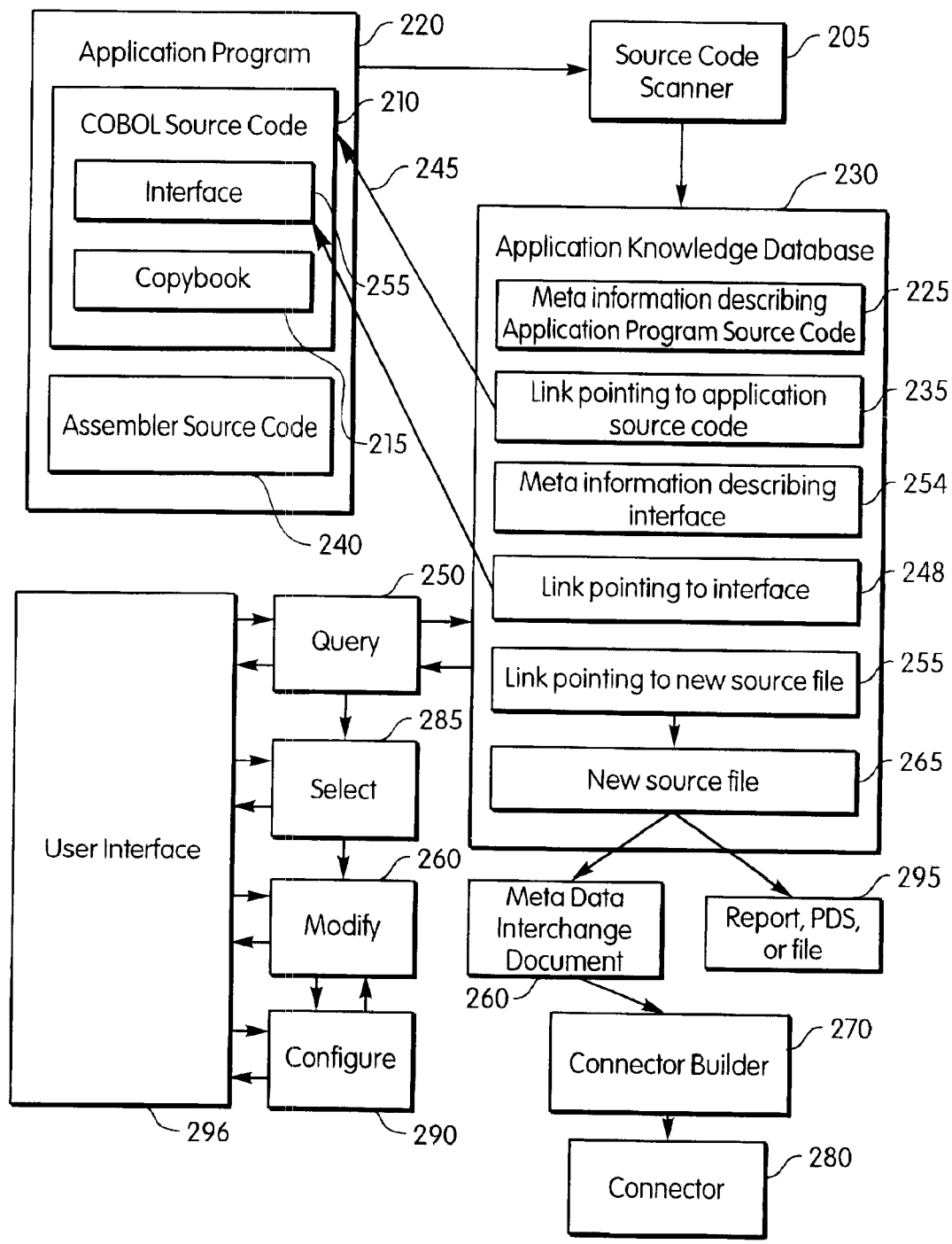
FIG. 2 is a block diagram of a preferred embodiment of the present invention.

Referring now to FIG. 2, a block diagram of a preferred embodiment of the present invention, known as a Connector Builder Assistant (CBA), is illustrated. The primary objective of the Connector Builder Assistant is to assist a user in the finding of useful application program assets for Web-enablement and the building of connectors from various environments (e.g., Java, C++) to these mainframe application program assets (such as COBOL, CICS, IMS, or DB2 transactions). Although the preferred embodiment is presented in the context of a COBOL and CICS example, the invention may be applied to provide connectors from other languages to other transaction targets, such as IMS. Source files 210, such as COBOL source files including copybooks 215 for an application 220, are parsed by a source code scanner 205 to identify meta information 225, and the meta information 225 is stored in a repository 230. The location 235 of the original source files 210, 215 and 240 for all of the meta information is also stored in the repository 230 providing linkage 245 back to the source files 210 for a given metadatum 225. This repository 230 may then be queried 250 by a user to determine which source files 210, 215 and 240 comprise the application 220, and more specifically, which interfaces 255 comprise the application 220. Using editor-style commands 260, the user may construct a new source file 265 that comprises the interface definition required by a connector tool 270 to build a connector 280 to the application. This may involve selecting 285 and/or modifying 260 a portion out of one file, expanding another file (i.e., COPYBOOK) inline, or a combination of the two. This is a non-destructive operation in that the original files remain unchanged. An XMI (XML Metadata Interchange) document 275 is then created that contains the information required by the connector tool 270 in a canonical format. The XMI document is able to represent interfaces for many languages such as COBOL, PLI, Assembler, C, C++, and others. The production of the XMI document 275 allows the connector tool 270 to consume the XMI instead of consuming the actual program source files 210, 215, and 240. This relieves the connector tool 270 from the burden of parsing multiple different languages and various dialects of those languages.

Figure 3:
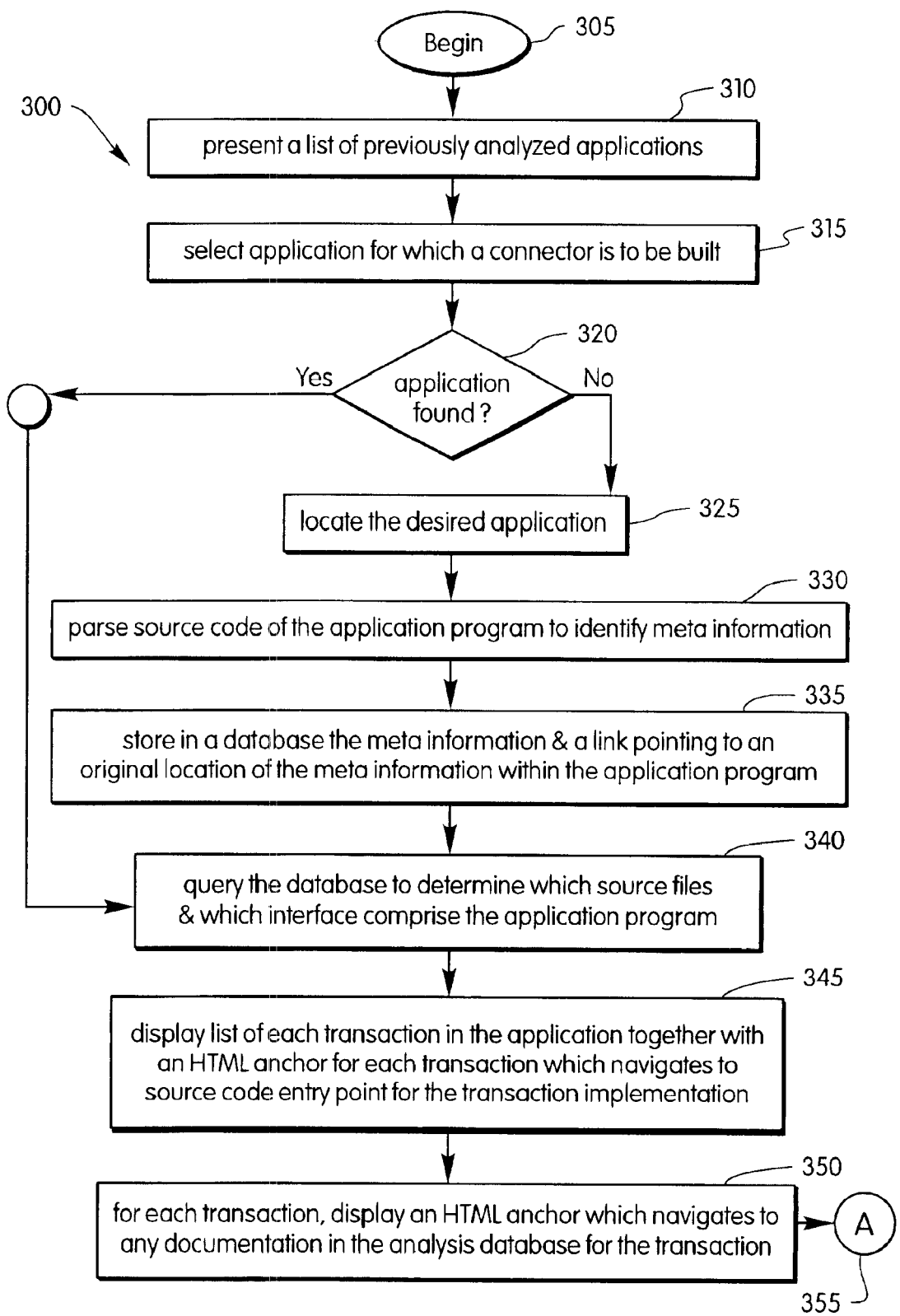
FIG. 3 and FIG. 4 are flowcharts illustrating operations preferred in carrying out the preferred embodiment of the present invention.
Figure 4:
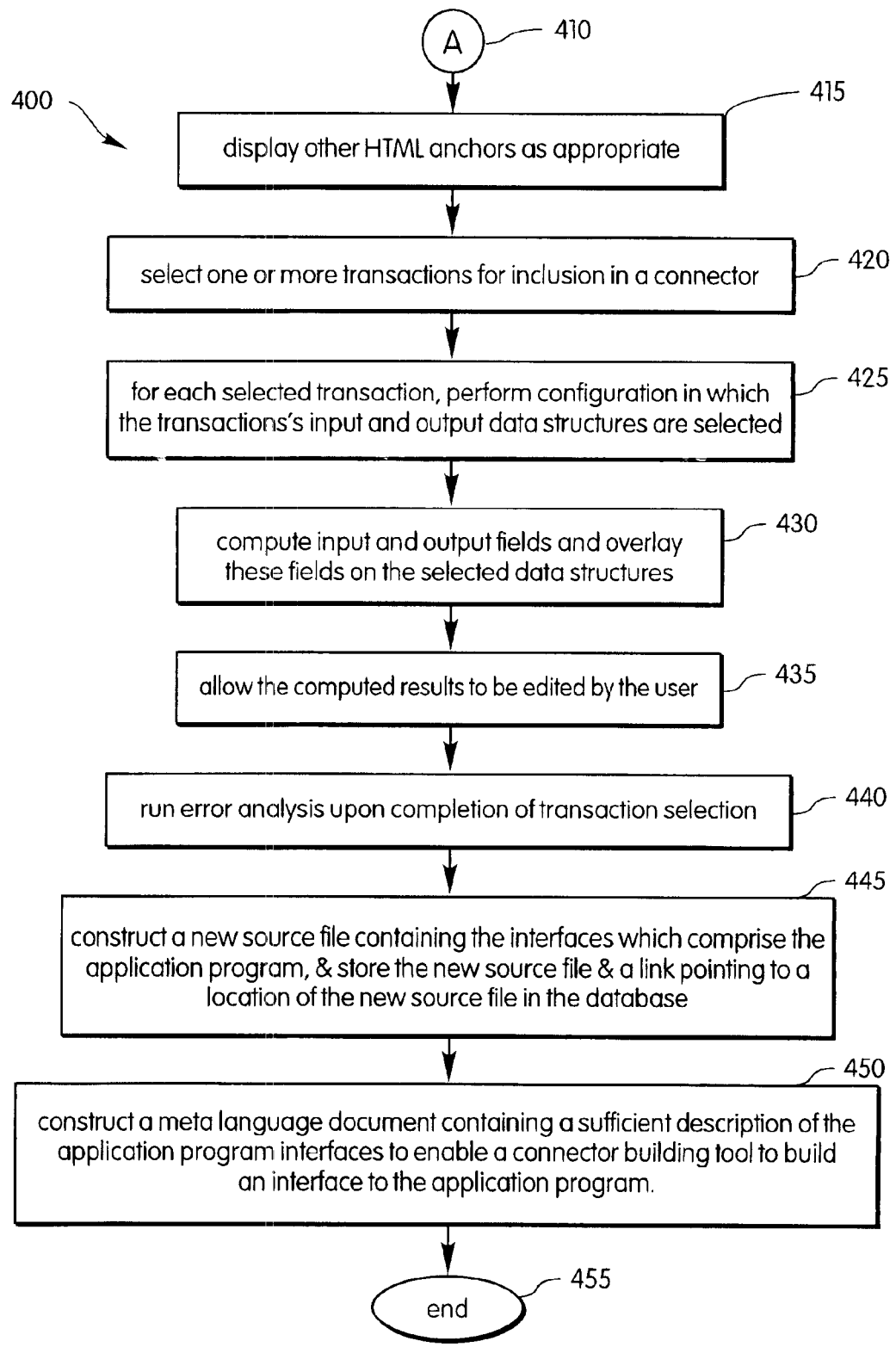

Referring now to FIGS. 3 and 4, the flowcharts 300 and 400 illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Creating a Connector Builder Project

After the start 305 of the process 300, the user accesses the repository 230, preferably via a URL (uniform resource locator), which causes process block 310 to present a list of previously analyzed applications. The items in the presented list are HTML anchors; clicking on any of the HTML anchors selects the application program for which a connector is to be created. The user may also run various queries such as transactions within an application, transactions by site, transactions by region, or transactions accessing a particular data store (file or database). Filters may also be added to the queries such as a filter to show screen-based transactions only or a filter to show LINK transactions only. If the user selects one of these queries, then a list of transactions is presented according to applications, sites, regions, or data stores as appropriate to the query. The user may then select one or more transactions from the list.

Process block 315 allows the user to select an application, site, region, or data store 220 for which a connector 280 is to be built. Decision block 320 determines if the selected application 220 has been previously analyzed. If not, then process block 325 locates the selected application 220, and process block 330 performs application analysis to parse the source code 210 of the application program 220 to identify meta information 225. Thereafter, process block 335 stores in the repository 230 the meta information 225 and a link 235 pointing to an original location 210 of the meta information within the application program 220.

Identifying Transactions to be Analyzed

Figure 5:
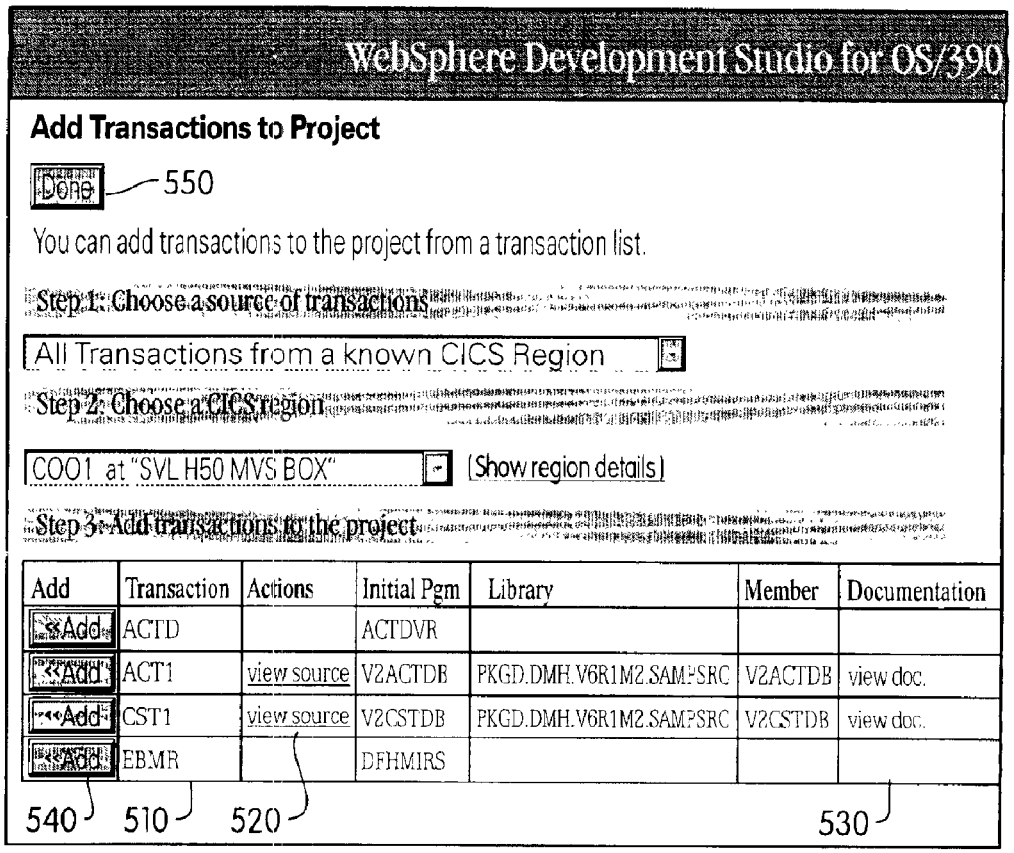
FIG. 5, FIG. 6, and FIG. 7 are graphical user interfaces preferred in carrying out a user interface 296 of the preferred embodiment of the present invention.
Figure 6:
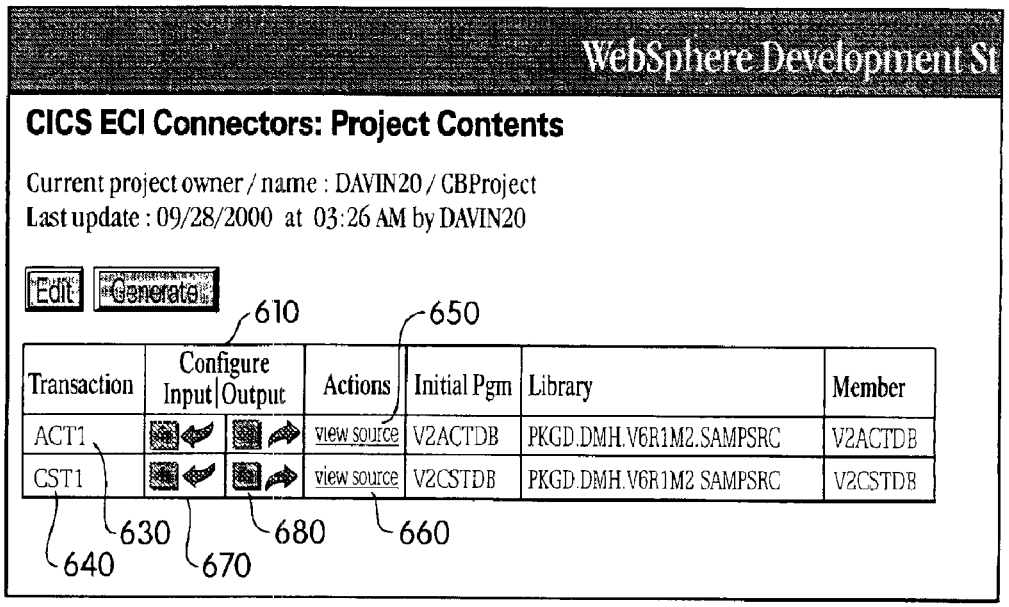

Process block 340 then allows the user to query the repository 230 to determine which source files (210, 215, and 240) and which interfaces 255 comprise the application program 220. Responsive to the query, process block 345 displays a list 510 of the transactions comprising the application program as shown in FIG. 5. For each transaction contained in the application program 220, a visual indicia 520 is displayed such as an HTML anchor which navigates 252 via a link 248 to an entry point of the source code 255 corresponding to the transaction to aid the user in determining whether the transaction should be included in the connector being developed. As the transaction name may not be sufficient to enable this determination, the user may evaluate meta information describing the transaction 254, the input/output specification 610 for the transaction, or other information in the source code implementation (650 and 660) of the transaction to make this determination as shown in FIG. 6. Process block 350 may display a visual indicia 530 which navigates to documentation stored in the repository 230 corresponding to the transaction.

For example, the results of a query for CICS ECI transactions may be displayed in the form of a list of transactions as shown in FIG. 6. For each transaction, the Connector Builder Assistant displays:

The transaction name (630 and 640) and other information.

A "Build Connector" check box or button 540, initially unselected, indicating whether or not the user wants the associated transaction included in the connector.

A "Show Source" link (520 and 660) leading to a view of the source code of the primary entry point of the main program which is started by the transaction which may be viewed via an editor or browser.

A "Configure" link (670 and 680) leading to the CICS ECI Transaction Configuration page, described below.

A "Configured" check box, initially unchecked, and automatically turned on if the user configures by following the Configure link. The user may also accept a default configuration by manually checking this box. The default configuration assumes that a DFHCOMMAREA data structure is used as both input and output. It also assumes that get and set methods should be built for all elementary data items in a COMMAREA.

A "Name" field in which the user may enter a name for the CBA session. If the CBA session was named on a previous page, the name is carried forward onto this page.

A "Done" button (550 and 770) causes the CICS ECI Transaction Builder Assistant processing, documented below.

For each transaction, an indication is also displayed as to whether this transaction is a LINK transaction, a BMS transaction, or an undetermined type of transaction. A check button 540 is displayed adjacent each transaction which the user may click to select the transaction for inclusion in the connector. For a link transaction, under the transaction name and description are displayed one or more HTML anchors 760 representing links 248 stored in the repository 230 which navigate 252 to the interface 255 associated with the transaction. For a BMS transaction, under the transaction name and description are displayed one or more HTML anchors which navigate to the BMS map descriptions for the transaction. No I/O HTML anchors are displayed for an undetermined transaction. The process then continues to process block 415 on FIG. 4. This path is illustrated by flowchart connector 355 on FIG. 3 and flowchart connector 410 on FIG. 4. Process block 415 displays other HTML anchors as appropriate.

Identifying Data Structures

Figure 7:
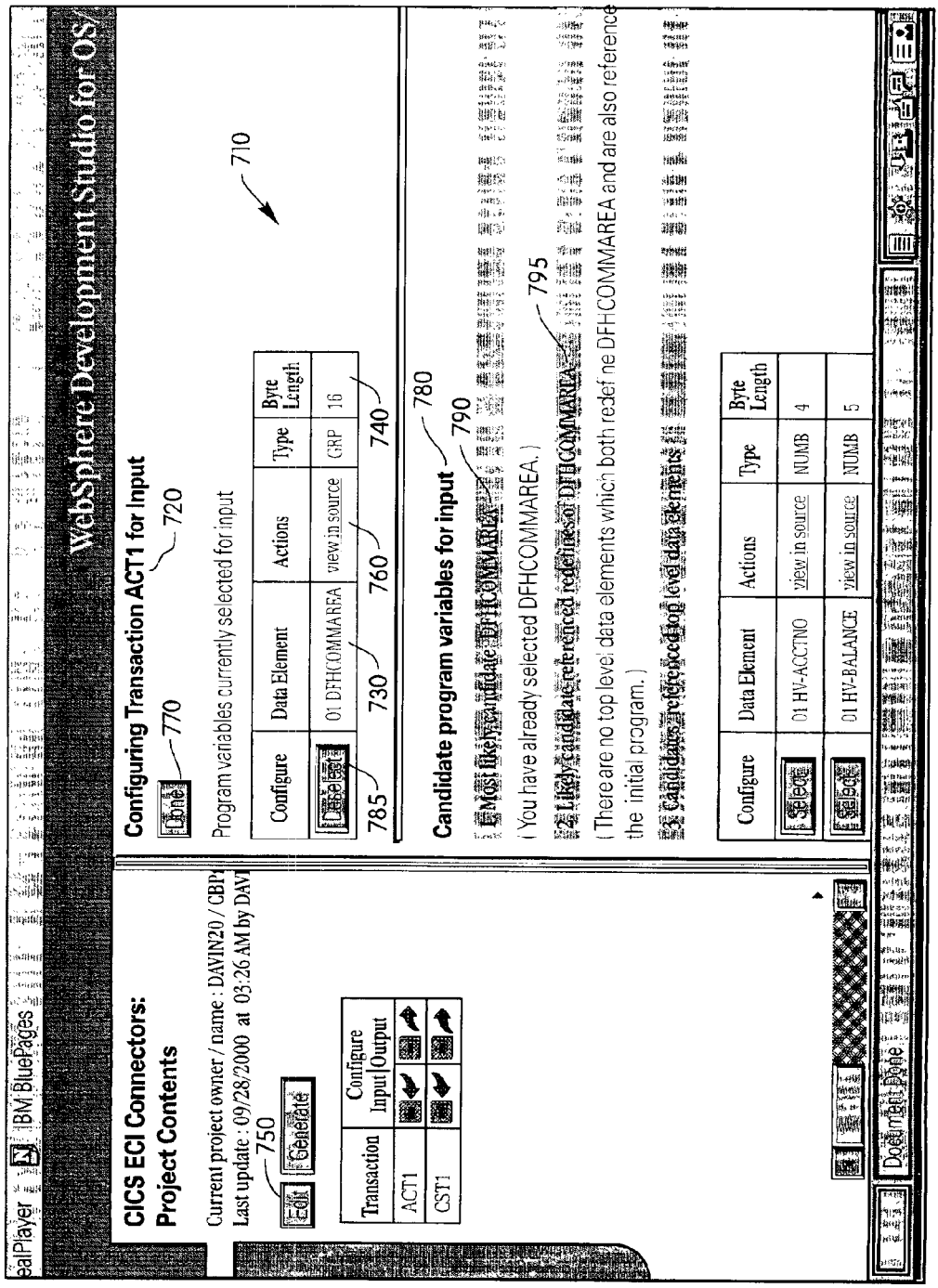

Process block 420 allows the user to select a displayed transaction for inclusion in the connector and configuration 290. For each selected transaction 630 and 640, process block 425 may display a data structure 710, such as the CICS example shown in FIG. 7, corresponding to the selected transaction 720 to enable the user to choose the selected transaction's input and output data structures. Although the invention is presented in the context of this CICS example, the invention may be practiced to select transactions and data structures of other transaction systems. FIG. 7 illustrates a CICS ECI Transaction Configuration page which lists all 01 level COBOL data structures which are candidates for an input data structure 780, and, as a separate list, all variables which are candidates for an output data structure. The two data structure lists are ordered by I/O likelihood. I/O likelihood is computed as follows from highest to lowest:

DFHCOMMAREA 790 is most likely for input or output.
Any 01 structures 795 which REDEFINE or RENAME DFHCOMMAREA and are referenced (for input) or set (for output) in the program.
Any 01 structures which are MOVEd into from (input) DFHCOMMAREA or which are MOVEd to (output) DFHCOMMAREA.
All remaining 01 structures.
A non-01 level data structures.

Within the above categories, the variables are listed alphabetically. The user may select by the use of check boxes one or more variables for input, and one or more variables for output. A "Configure Fields" link 785 for each data structure leads to a CICS ECI Transaction Field Configuration Page which allows the user to select, using a check box, whether a given field is to be included or not (for input/output as appropriate). A "Done" button 770 records the user configuration entered on this page.

Process block 425 allows the user to select a data structure 730, and for the selected data structure 730, process block 430 computes input and output fields and overlays the fields 740 on the selected data structure 730. The input and output fields 740 are used by a connector builder tool 270 to determine what get and set methods to create on the connector 280. IO Interface Analysis computes the IO fields and IO interface of a given program using the data in the repository about variables set and referenced within a callable program and all the programs it calls. The IO Interface analysis propagates through CALL, LINK, and XCTL statements within the analyzed program. This process may be recursive as the called program may in turn call another. Process block 435 allows the user to edit 750 the computed fields 740 if the user disagrees with the computed results provided by the IO Interface Analysis; and process block 440 analyzes the selections and editions to determine if an error exists in the selection. For example, if the user selects an undetermined transaction type, then a warning may be given that no information will be exported to the connector other than the transaction name. If the user selects a transaction whose type is determined, but whose information is incomplete, a warning is given. If the user has selected no transactions, an error is given.

Creating Analysis and Report Files

Thereafter, process block 445 constructs a new source file 265 containing the interfaces which comprise the application program 220, and stores the new source file 265 and a link 255 pointing to a location of the new source file 265 in the repository 230. In the preferred embodiment, this file is a copybook-like file containing all 01 level data structures which are an input or output, as well as input and output information, in a human readable form 295 and/or an XML file 275. The user may view the HTML rendered report 295 which lists the application name; connectivity information such as that needed to configure TCP62 and the ECI client; each transaction of the application by name; and for a LINK transaction, the input and output COMMAREAs together with any data element descriptions that may be in the analysis repository; or for a BMS transaction, the input and output BMS maps together with any screen and data element descriptions that may be in the analysis repository. Additionally, if information about the data item usage (input only, output only, or input/output) in the transaction is known, it is listed in this report. Process block 450 then constructs a meta language document 275 containing a description of the application program interfaces to enable a connector building tool 270 to build a connector interface 280 to the application 220. The process then ends at process block 455.

Returning now to decision block 320, if the selected application is found, then processing continues to process block 340 which allows the user to query the repository to determine which source files and which interfaces comprise the application program.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. A method of identifying an interface of an application program comprising the interface and source code, said method comprising the steps:
   parsing the source code of the application program to identify meta information;
   storing in a repository the meta information and a link pointing to an original location of the meta information within the application program, wherein original locations store information about source files and interfaces comprising application program;
   allowing a user to query the repository to determine which of the source files and which of the interfaces comprise the application program;
   constructing a new source file containing the interfaces which comprise the application program;
   storing the new source file and a link pointing to a location of the new source file in the repository; and
   constructing a meta language document containing a description of the application program interfaces to enable a connector building tool to build an interface to the application program.

2. The method of claim 1 further comprising the step of:
   for a transaction contained in the application program, displaying a first visual indicium which navigates via a link to an entry point of the source code corresponding to the transaction.

3. The method of claim 2 further comprising the step of:
   displaying the transaction contained in the application program together with a second visual indicium which navigates to documentation stored in the repository corresponding to the transaction.

4. The method of claim 3 further comprising the steps of:
   allowing the user to select the transaction;
   displaying a data structure corresponding to the selected transaction;
   allowing the user to select the data structure; and
   for the selected data structure, computing input and output fields and overlaying the fields on the selected data structure.

5. The method of claim 4 further comprising the steps of:
   allowing the user to edit the computed fields; and
   analyzing the selections and editions to determine if an error exists.

6. The method of claim 3, wherein the link is a first link, wherein the meta information is a first meta information that describes the source code, wherein the original location is a first original location, the method further comprising:
   storing in the repository second meta information that describes the interface and a second link pointing to a second original location of the second meta information describing the interface.

7. The method of claim 6, wherein the interfaces are application programming interfaces to the application programs, and wherein the application programs are capable of being accessed via application programming interfaces.

8. A method of identifying an interface of an application program comprising the interface and source code, said method comprising the steps:
   parsing the source code of the application program to identify meta information;
   storing in a repository the meta information and a link pointing to an original location of the meta information within the application program, wherein original locations store information about source files and interfaces comprising application programs;
   allowing a user to query the repository to determine which of the source files and which of the interfaces comprise the application program;
   for a transaction contained in the application program, displaying a first visual indicium which navigates via a link to an entry point of the source code corresponding to the transaction;
   displaying the transaction contained in the application program together with a second visual indicium which navigates to documentation stored in the repository corresponding to the transaction;
   allowing the user to select the transaction;
   displaying a data structure corresponding to the selected transaction;
   allowing the user to select the data structure; and
   for the selected data structure, computing input and output fields and overlaying the fields on the selected data structure;
   allowing the user to edit the computed fields;
   analyzing the selections and editions to determine if an error exists.
   constructing a new source file containing the interfaces which comprise the application program;
   storing the new source file and a link pointing to a location of the new source file in the repository; and
   constructing a meta language document containing a description of the application program interfaces to enable a connector building tool to build an interface to the application program.

9. An article of manufacture for use in a computer system for identifying an interface of an application program comprising the interface and source code, said article of manufacture comprising a computer-readable storage medium having a computer program embodied in said medium which causes the computer system to execute a method comprising the steps of:
   parsing the source code of the application program to identify meta information;
   storing in a repository the meta information and a link pointing to an original location of the meta information within the application program, wherein original location store information about source files and interfaces comprising application programs;
   allowing a user to query the repository to determine which of the source files and which of the interfaces comprise the application program;
   constructing a new source file containing the interfaces which comprise the application program;
   storing the new source file and a link pointing to a location of the new source file in the repository; and
   constructing a meta language document containing a description of the application program interfaces to enable a connector building tool to build an interface to the application program.

10. The article of manufacture of claim 9 wherein the embodied computer program further causes the computer system to execute the method step:
    for a transaction contained in the application program, displaying a first visual indicium which navigates via a link to an entry point of the source code corresponding to the transaction.

11. The article of manufacture of claim 10 wherein the embodied computer program further causes the computer system to execute the method step:

displaying the transaction contained in the application program together with a second visual indicium which navigates to documentation stored in the repository corresponding to the transaction.

12. The article of manufacture of claim 11 wherein the embodied computer program further causes the computer system to execute the method steps:

allowing the user to select the transaction;

displaying a data structure corresponding to the selected transaction;

allowing the user to select the data structure; and for the selected data structure, computing input and output fields and overlaying the fields on the selected data structure.

13. The article of manufacture of claim 12 wherein the embodied computer program further causes the computer system to execute the method steps:

allowing the user to edit the computed fields; and analyzing the selections and editions to determine if an error exists.

14. The article of manufacture of claim 11, wherein the link is a first link, wherein the meta information is a first meta information that describes the source code, wherein the original location is a first original location, and wherein the embodied computer program further causes the computer system to execute the method step:

storing in the repository second meta information that describes the interface and a second link pointing to a second original location of the second meta information describing the interface.

15. The article of manufacture of claim 14, wherein the interfaces are application programming interfaces to the application programs, and wherein the application programs are capable of being accessed via the application programming interface.

16. An article of manufacture of identifying an interface of an application program comprising the interface and source code, said article of manufacture comprising a computer-readable storage medium having a computer program embodied in said medium which causes the computer system to execute a method comprising the steps of:

parsing the source code of the application program to identify meta information;

storing in a repository the meta information and a link pointing to an original location of the meta information within the application program, wherein original locations store information about source files and interfaces comprising application programs;

allowing a user to query the repository to determine which of the source files and which of the interfaces comprise the application program;

for a transaction contained in the application program, displaying a first visual indicium which navigates via a link to an entry point of the source code corresponding to the transaction;

displaying the transaction contained in the application program together with a second visual indicium which navigates to documentation stored in the repository corresponding to the transaction;

allowing the user to select the transaction;

displaying a data structure corresponding to the selected transaction;

allowing the user to select the data structure; and for the selected data structure, computing input and output fields and overlaying the fields on the selected data structure;

allowing the user to edit the computed fields;

analyzing the selection and editions to determine if an error exists;

constructing a new source file containing the interfaces which comprise the application program;

storing the new source file and a link pointing to a location of the new source file in the repository; and constructing a meta language document containing a description of the application program interfaces to enable a a connector building tool to build an interface to the application program.

17. A computer system for identifying an interface of an application program comprising the interface and source code, said computer system comprising:

a parser for parsing the source code of the application program to identify meta information;

storage for storing in a repository the meta information and a link pointing to an original location of the meta information within the application program, wherein original locations store information about source files and interfaces comprising application programs;

a query of the repository to determine which of the source files and which of the interfaces comprise the application program;

a new source file containing the interfaces which comprise the application program;

storage for storing the new source file and a link pointing to a location of the new source file in the repository; and a meta language document containing a description of the application program interfaces to enable a a connector building tool to build an interface to the application program.

18. The computer system or claim 17 further comprising:

a first visual indicium, for a transaction contained in the application program, which navigates via a link to an entry point of the source code corresponding to the transaction.

19. The computer system of claim 18 further comprising:

a second visual indicium, displayed with the transaction contained in the application program, which navigates to documentation stored in the repository corresponding to the transaction.

20. The computer system of claim 19 further comprising:

a selected transaction;

a display of a data structure corresponding to the selected transaction;

a selected data structure;

computed input and output fields for the selected data structure; and an overlay of the fields on the selected data structure.

21. The computer system of claim 20 further comprising:

an editor for editing the computed fields; and an analyzer for analyzing the selections and editions to determine if an error exists.

22. The system of claim 19, wherein the link is a first link, wherein the meta information is a first meta information that describes the source code, wherein the original location is a first original location, and wherein the storage further stores second meta information that describes the interface and a second link pointing to a second original location of the second meta information describing the interface.

23. The system of claim 22, wherein the interfaces are application programming interfaces to the application programs, and wherein the application programs are capable of being accessed via the application programming interfaces.

24. A computer system for identifying an interface of an application program comprising the interface and source code, said computer system comprising:

a parser for parsing the source code of the application program to identify meta information;

storage for storing in a repository the meta information and a link pointing to an original location of the meta information within the application program, wherein original locations store information about source files and interfaces comprising application program;

a query of the repository to determine which of the source files and which of the interfaces comprise the application program;

a display of a first visual indicium, for a transaction contained in the application program, which navigates via a link to an entry point of the source code corresponding to the transaction;

a display of a second visual indicium, together with the transaction contained in the application program, which navigates to documentation stored in the repository corresponding to the transaction;

a selected transaction;

a display of a data structure corresponding to the selected transaction;

a selected data structure;

computed input and output fields for the selected data structure;

an overlay of the fields on the selected data structure;

an editor for editing the computed fields;

an analyzer for analyzing the selections and editions to determine if an error exists;

a new source file containing the interfaces which comprise the application program;

storage for storing the new source file and a link pointing to a location of the new source file in the repository; and a meta language document containing a description of the application program interfaces to enable a connector building tool to build an interface to the application program.

* * * * *

UNITED STATES PATENT AND TRADEMARK OFFICE
CERTIFICATE OF CORRECTION

| | | |
|---|---|---|
| PATENT NO. | : 6,915,487 B2 | Page 1 of 1 |
| APPLICATION NO. | : 09/734833 | |
| DATED | : July 5, 2005 | |
| INVENTOR(S) | : Peter D. Costigan, Jr., Laurence Edward England, and James R. Rhyne, II | |

It is certified that error appears in the above-identified patent and that said Letters Patent is hereby corrected as shown below:

Column 9, line 13, delete "program;" and insert -- programs; -- .
Line 60, after "via" insert -- the -- .

Column 10, line 8, delete "via a" and insert -- via the -- .

Column 12, line 6, delete "selection" and insert -- selections -- .

Column 12, line 40, delete "or" and insert -- of -- .

Signed and Sealed this

Twenty-first Day of November, 2006

JON W. DUDAS
*Director of the United States Patent and Trademark Office*